United States Patent
Hatte et al.

(10) Patent No.: US 12,506,639 B2
(45) Date of Patent: Dec. 23, 2025

(54) REMOTE CONNECTION RESUMPTION WITH PREVIOUS SECURE TUNNEL IP ADDRESS

(71) Applicant: Versa Networks, Inc., Santa Clara, CA (US)

(72) Inventors: Veerabhushan K. Hatte, Fremont, CA (US); Narasimha Talapady Nayak, Cupertino, CA (US); Pavan Gururaj Katti, Santa Clara, CA (US)

(73) Assignee: Versa Networks, Inc., San Jose, CA (US)

( * ) Notice: Subject to any disclaimer, the term of this patent is extended or adjusted under 35 U.S.C. 154(b) by 452 days.

(21) Appl. No.: 17/734,039

(22) Filed: Apr. 30, 2022

(65) Prior Publication Data
US 2023/0353421 A1    Nov. 2, 2023

(51) Int. Cl.
  *H04L 12/46* (2006.01)
  *H04L 9/40* (2022.01)
  *H04L 65/1066* (2022.01)

(52) U.S. Cl.
  CPC ...... *H04L 12/4633* (2013.01); *H04L 12/4641* (2013.01); *H04L 63/0272* (2013.01); *H04L 65/1066* (2013.01)

(58) Field of Classification Search
  CPC .................. H04L 12/4633; H04L 12/4641
  See application file for complete search history.

(56) References Cited

U.S. PATENT DOCUMENTS

| | | | | |
|---|---|---|---|---|
| 7,804,826 | B1* | 9/2010 | Khalil | H04W 12/033 370/392 |
| 2006/0230446 | A1* | 10/2006 | Vu | H04L 63/166 726/15 |
| 2018/0054420 | A1* | 2/2018 | Mindte | H04L 67/06 |
| 2022/0217573 | A1* | 7/2022 | Balasubramanian | H04W 28/0236 |
| 2022/0321401 | A1* | 10/2022 | Vuggrala | H04L 61/5007 |
| 2023/0231802 | A1* | 7/2023 | Vysotsky | H04L 12/4633 709/224 |

OTHER PUBLICATIONS

D. Ahmat and D. Magoni, "MUSeS: Mobile User Secured Session" 2012 IFIP Wireless Days, Dublin, Ireland, 2012, pp. 1-6, doi: 10.1109/WD.2012.6402807. (Year: 2012).*

(Continued)

*Primary Examiner* — Ayaz R Sheikh
*Assistant Examiner* — Christopher R Davis
(74) *Attorney, Agent, or Firm* — LOZA & LOZA, LLP

(57) ABSTRACT

Resumption of a remote connection is described with a previous secure tunnel IP address. In embodiments, a first secure tunnel is facilitated with a client. The first secure tunnel has a tunnel IP address. The tunnel IP address is sent to the client. Packets are communicated from the client received through the first secure tunnel to a remote server using the tunnel IP address in the first secure tunnel. The first secure tunnel is closed and a second secure tunnel is facilitated with the client. A request is received from the client to resume the remote connection, that includes the tunnel IP address. The remote connection is resumed by communicating packets from the client received through the second secure tunnel to the remote server using the tunnel IP address in the second secure tunnel.

20 Claims, 9 Drawing Sheets

(56) References Cited

OTHER PUBLICATIONS

The Internet Key Exchange (IKE), Internet Engineering Task Force (IETF), Request for Comments 2409 (Year: 1998).*
Security Architecture for the Internet Protocol, Internet Engineering Task Force (IETF), Request for Comments 4301 (Year: 2005).*
Internet Key Exchange (IKEv2) Protocol, Internet Engineering Task Force (IETF), Request for Comments 4306 (Year: 2005).*
IKEv2 Mobility and Multihoming Protocol (MOBIKE), Internet Engineering Task Force (IETF), Request for Comments 4555 (Year: 2006).*
Internet Key Exchange Protocol Version 2 (IKEv2) Session Resumption, Internet Engineering Task Force (IETF), Request for Comments 5723 (Year: 2010).*
Request for Comments 5077 (RFC 5077), titled Transport Layer Security (TLS) Session Resumption without Server-Side State. (Year: 2008).*
SC Magazine, Making the right connection: Which VPN—SSL, IPsec or both. (Year: 2003).*
NetScreen, VPN Decision Guide (Year: 2004).*

* cited by examiner

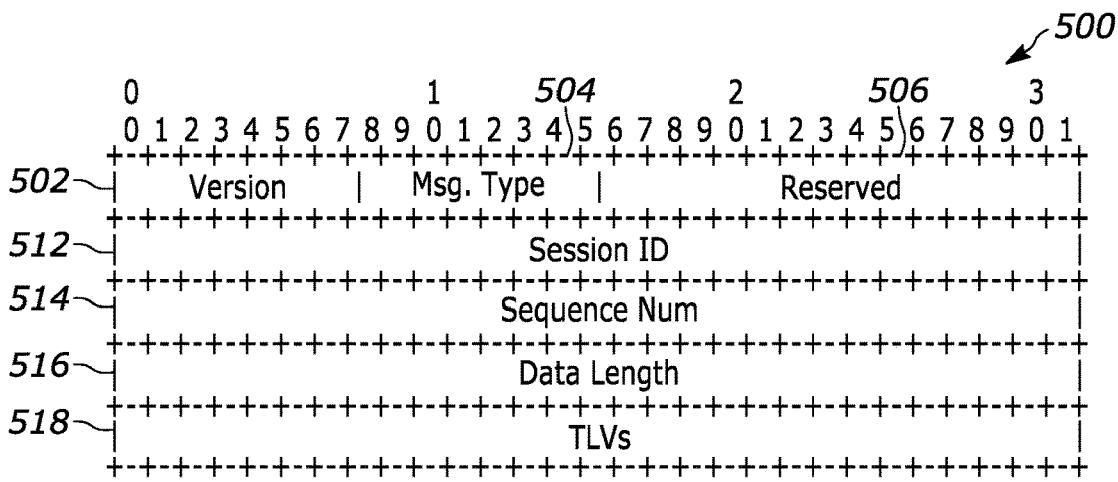

Version(8):
- 0x1 – version 1 of Seamless VPN Protocol

Msg. Type (8):
- SEAMLESS_VPN_REQ_TUNNEL_ADDRESS
- SEAMLESS_VPN_RSP_TUNNEL_ADDRESS
- SEAMLESS_VPN_HEART_BEAT Session ID(32):
- 0x00000000    -- Init Start
- Specific Value -- Restart/Mobile case.

FIG. 5

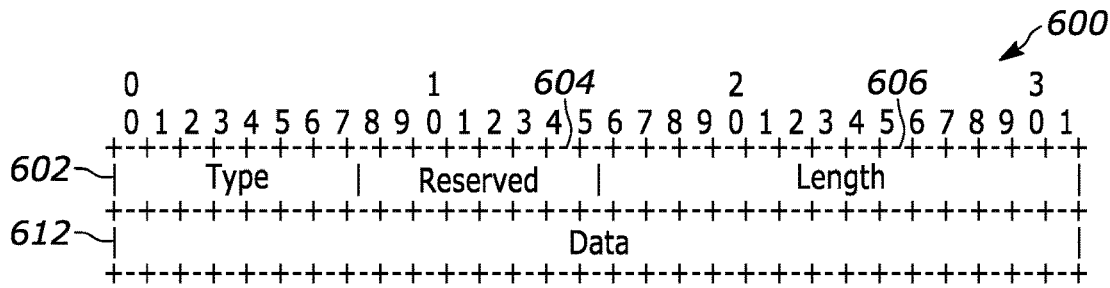

Type(8):
- SEAMLESS_TLV_VPN_IPV4
- SEAMLESS_TLV_VPN_IPV6
- SEAMLESS_TLV_HEART_BEAT_REQ
- SEAMLESS_TLV_HEART_BEAT_RSP Data(32 or more):
- 0x00000000    -- Init Start. Request for Non-Sticky Tunnel Address.
- 0xFFFFFFFF    -- Init Start. Request for Sticky Tunnel Address.
- Specific Value -- Request for Specific Tunnel Address(IPv4/IPv6).

| VPN Tunnel Management Data Structure | | | | | |
|---|---|---|---|---|---|
| Index | VPN Session | Tunnel IP Address | Remote Session Indices | | |
| 0 | VPN-Sess-A | 10.10.10.10 | 0 | 1 | 2 |
| 1 | VPN-Sess-B | 10.10.10.12 | | | |
| 2 | VPN-Sess-C | 10.10.10.14 | 6 | | |

| VPN Child Session Data Structure | | |
|---|---|---|
| Index | Remote Session Info | VPN Session Index |
| 0 | | 0 |
| 1 | | 0 |
| 2 | | 0 |
| 3 | | 0 |
| 4 | | 1 |
| 5 | | 0 |
| 6 | | 2 |
| 7 | | 1 |

REMOTE CONNECTION RESUMPTION WITH PREVIOUS SECURE TUNNEL IP ADDRESS

TECHNICAL FIELD

The description relates to secure tunnel packet communication and, more particularly, to sessions with remote servers through such secure tunnel packet communication.

BACKGROUND

Users are able to access a wide range of services from remote servers using a local desktop or portable device, also known as a client. In some circumstances, a user simply requests data, for example a web page, file, or stream, to be delivered to the client. In other circumstances, the client is first authenticated with the remote service or remote server and then establishes a session for access to the services. The authentication may be as simple as submitting a user name and password, but other authentication methodologies are also used. Such services may include email, media consumption, productivity applications, data services for uploading or accessing data and many custom business and science applications. Data services typically use transmission control protocol (TCP)/internet protocol (IP) to communicate in which each packet includes a 5-tuple of Source IP Address, Source Port, Destination IP Address, Destination Port, and IP protocol.

To improve security and simplify access, a gateway, also called a gateway server, gateway router, or virtual private network (VPN) server, may be used between the client and the remote service or server. The gateway is typically another server that brokers data transactions. A variety of tunneling protocols are available for the connection between the client and the gateway to establish a VPN. These VPN protocols include an Internet Protocol Security (IPsec) protocol, a Transport Layer Security (TLS) protocol, and a Datagram Transport Layer Security (DTLS) protocol, among others.

With the tunnel, the packets between the client and the remote service or server are encrypted and encapsulated in a wrapper. A packet from the client becomes an inner packet that is encapsulated within an outer packet that is the wrapper. The inner packet is sometimes referred to as a child packet and the outer packet or wrapper is sometimes referred to as a parent packet. The wrapper is handled as its own packet with its own 5-tuple and encrypted contents. For encapsulated packets from the client, the wrapper has the client's IP address that is assigned by the Internet Service Provider (ISP) or network administrator as the source IP address and the gateway's IP address as the destination IP address. Similarly, for the wrapper for encapsulated packets from the gateway, the source IP address is the gateway IP address and the destination IP address is the client IP address.

When the gateway receives a packet through the tunnel, which is addressed to the gateway, then the gateway de-encapsulates the inner packet and forwards what was the inner packet to the appropriate remote service or server. The gateway may use a different tunnel or other security system to protect the contents of the inner packet on the path to the remote server. When the secure tunnel is established between the client and the gateway, the gateway assigns a tunnel IP address to the client. When forwarding a packet to a remote server, this tunnel IP address is used by the client as its client IP address. The remote server, accordingly, receives packets from and sends packets to the tunnel IP address assigned by the gateway and not the client IP address that was assigned by the ISP or network administrator. When Network Address Traversal (NAT) is used, the gateway may substitute a routable gateway IP address for the assigned tunnel IP address when forwarding packets to the remote server. The remote server then returns packets using the routable gateway IP address.

SUMMARY

Remote connections between a client and remote server through a gateway may be resumed by assigning a previous secure tunnel IP address. The tunnel IP address may be made sticky or persistent across different VPN tunnels. Embodiments herein disclose a method of maintaining communication between a remote server and a client through different secure tunnels. The method includes facilitating a first secure tunnel with the client, the first secure tunnel having a tunnel Internet Protocol (IP) address, sending the tunnel IP address to the client, communicating packets through a remote connection with the remote server from the client received through the first secure tunnel to the remote server using the tunnel IP address in the first secure tunnel, closing the first secure tunnel with the client, facilitating a second secure tunnel with the client, receiving a request from the client to resume the remote connection, the request including the tunnel IP address, and resuming the remote connection by communicating packets from the client received through the second secure tunnel to the remote server using the tunnel IP address in the second secure tunnel.

Further embodiments include assigning the received tunnel IP address to the second secure tunnel with the client in response to receiving the request. Further embodiments include receiving a request for a persistent tunnel IP address from the client through the first secure tunnel, wherein sending the tunnel IP address is in response to receiving the request for a persistent tunnel IP address. In further embodiments, sending the tunnel IP address comprises sending the tunnel IP address in a Type Length Value (TLV) field of a virtual private network (VPN) protocol header through the first secure tunnel.

In further embodiments, the remote connection is a remote session between the client and the remote server, and wherein communicating packets comprises communicating packets within the remote session. Further embodiments include receiving a request for a persistent tunnel IP address with the client through the first secure tunnel, facilitating the persistent tunnel IP address in response to the request for the persistent tunnel IP address; and storing the tunnel IP address in association with a session identifier of a VPN session.

Further embodiments include storing a parameter in association with the session identifier, wherein receiving the request comprises receiving the session identifier from the client, the method further comprising validating the parameter before assigning the tunnel IP address through the second secure tunnel. In further embodiments, the parameter includes an expiration and wherein validating the parameter comprises validating that the VPN session has not expired.

Further embodiments include connecting to a first secure session with the client for the first secure tunnel and connecting to a second secure session with the client for the second secure tunnel, and wherein receiving a request from the client comprises receiving a session identifier for the first secure session. Further embodiments include applying the session identifier to verify the tunnel IP address.

In further embodiments, receiving a request to resume the connection comprises receiving the request in a Type Length Value (TLV) field of a virtual private network (VPN) protocol header through the second secure tunnel. Further embodiments include comparing the tunnel IP address received from the client through the second secure tunnel to a stored tunnel IP address that is associated with the first secure tunnel. In further embodiments, communicating packets through the first secure tunnel comprises de-capsulating packets received from the client with the tunnel IP address and forwarding the de-capsulated packets to the remote server using a routable gateway IP address as a source address and an IP address of the remote server as a destination IP address. Further embodiments include storing the destination IP address in association with the tunnel IP address.

Embodiments herein disclose a non-transitory computer-readable storage medium containing program instructions, which when executed by the computer cause the computer to perform operations comprising facilitating a first secure tunnel with a client, the first secure tunnel having a tunnel Internet protocol (IP) address, sending the tunnel IP address to the client, communicating packets through a remote connection with a remote server from the client received through the first secure tunnel to the remote server using the tunnel IP address in the first secure tunnel, closing the first secure tunnel with the client, facilitating a second secure tunnel with the client, receiving a request from the client to resume the remote connection, the request including the tunnel IP address, and resuming the remote connection by communicating packets from the client received through the second secure tunnel to the remote server using the tunnel IP address in the second secure tunnel.

Further embodiments include storing the tunnel IP address in association with a remote session identifier for a remote session between the client and the remote server, wherein resuming the remote connection comprises resuming the remote session using the remote session identifier.

Further embodiments include receiving a request for a persistent tunnel IP address through the first secure tunnel, facilitating the persistent tunnel IP address with the client in response to the request for the persistent tunnel IP address, storing the tunnel IP address in association with a session identifier of the persistent tunnel IP address, storing an expiration parameter in association with the session identifier, and validating the expiration parameter by validating that the VPN session has not expired before assigning the tunnel IP address through the second secure tunnel.

Embodiments herein disclose a method of maintaining communication with a remote server through different secure tunnels and a gateway, the method comprising, establishing a first secure tunnel with the gateway, the first secure tunnel having a tunnel Internet Protocol (IP) address, receiving the tunnel IP address from the gateway, communicating packets through a remote connection with the remote server through the first secure tunnel and the gateway with the remote server using the tunnel IP address in the first secure tunnel with the gateway, closing the first secure tunnel with the gateway, establishing a second secure tunnel with the gateway, sending a request to the gateway to resume the remote connection, the request including the tunnel IP address, and resuming the remote connection by communicating packets through the second secure tunnel and the gateway to the remote server using the tunnel IP address in the second secure tunnel with the gateway.

Further embodiments include sending a request for a persistent tunnel IP address from the client through the first tunnel in a Type Length Value (TLV) field of a virtual private network (VPN) protocol header, wherein sending the request to resume the remote connection comprises sending the request in a Type Length Value (TLV) field of a virtual private network (VPN) protocol header through the second secure tunnel and sending a session identifier of the first secure tunnel.

In further embodiments, establishing a first secure tunnel comprises establishing a VPN session with the gateway by a VPN client, the method further comprising establishing a remote session with the remote server by a web client, and wherein communicating packets to the remote server comprises sending packets from the web client in the remote session to the remote server through the VPN client in the VPN session.

BRIEF DESCRIPTION OF THE FIGURES

The embodiments herein will be better understood from the following detailed description with reference to the drawing figures, in which:

FIG. 5 is a diagram of an example protocol header suitable for carrying requests and replies in a TLS or DTLS VPN protocol suitable for embodiments herein;

FIG. 6 is a diagram of an example TLV field suitable for use with a header in a TLS or DTLS VPN protocol suitable for embodiments herein;

FIG. 7 is an example VPN session table suitable for embodiments herein;

FIG. 8 is an example remote session table suitable for embodiments herein;

DETAILED DESCRIPTION OF EMBODIMENTS

Figure 1:
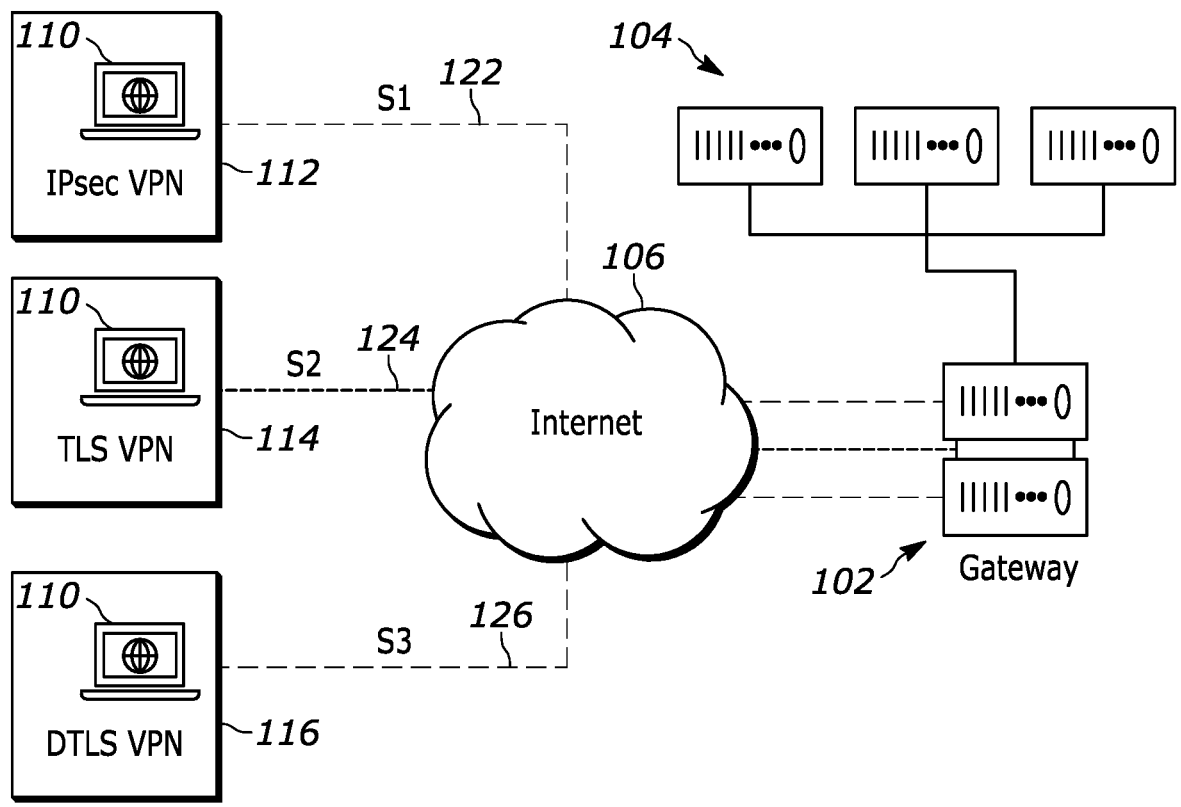
FIG. 1 is a block diagram of a client in different environments in communication with remote servers through a gateway suitable for embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein are described in the context of secure tunnels between a client and gateway in a Virtual Private Networks (VPN). The VPN may connect through any of a variety of different data network environments with different physical or virtual structures. These structures include virtual networks such as a Software Defined Wide Area Network (SD-WAN or SDWAN) where there is at least one designated hub node for each of the branch nodes and each hub node potentially acting as a gateway to a plurality of branch nodes. Further, branch nodes themselves may have direct access to the Internet through one or more WAN links. However, embodiments disclosed herein can be applied in non-software-defined WANs and for applications hosted within the network, e.g., within a LAN (Local Area Network).

A client can establish a secure connection with a gateway using a variety of different VPN protocols. The choice of protocol may be limited by the network service provider, network access point, or other agencies that are available to the client. Commonly, an IPsec VPN protocol operates in residential environments and a TLS VPN protocol operates in commercial or enterprise environments. In other environments only a DTLS VPN protocol is possible. When the client is moved from one environment to another, the client is first disconnected from the current VPN tunnel to the gateway and then is reconnected to the gateway with a new VPN tunnel. For each VPN tunnel, a new VPN session is created and a new tunnel IP address may be assigned to the client by the gateway. The disconnection and reconnection often cause the assigned tunnel IP address to change in response to the connection with a new VPN tunnel. This is especially likely when the new VPN tunnel uses a different VPN protocol.

The gateway serves, at least in part, to broker data transactions between the client and various remote services. These services are connected to the client for data transactions and may also have remote sessions with the client. When the VPN tunnel is disconnected, the remote service is disrupted. Any existing traffic that originated with the client or that was destined for the client will be disrupted by the disconnection. In addition, the remote service connection may be broken when the remote server sees a change in the tunnel IP address.

The tunnel IP address is the destination IP address used by the client to receive inner packets from the remote server through the gateway and the source IP address used by the client to send inner packets to the remote server through the gateway. The gateway receives the inner packets from the remote server addressed to the client and then encapsulates them in an outer wrapper with the client's actual IP address to tunnel to the client. The disruption in service may require that the remote session be re-established and security protocols may be invoked to make it more inconvenient to re-establish the remote session. This can be an inconvenience to the user or worse and may discourage use of the remote service or of the VPN tunneling service.

As described herein, a remote connection or remote session may be successfully resumed by maintaining the same tunnel IP address before and after the disconnection and reconnection of the VPN. As described herein, using certain signaling and tables, the remote service may maintain the same remote session with the client even when the VPN tunnel is changed. The gateway may also migrate any disrupted remote sessions from the previous VPN tunnel and tunnel IP address to the new VPN tunnel by assigning the same tunnel IP address to the new VPN tunnel. As a result, the remote sessions do not see any change in the status of the client or in the IP address used by the remote service for data exchange or sessions.

When the client establishes a new VPN tunnel with the gateway, the client may have a new IP address, and a new VPN protocol. When the client is authenticated to the gateway by an external authentication service, information about the client may be limited. This may be done for simplicity or to protect information about the client. As described below, after authentication and after a new VPN session is established, the client sends the previous tunnel IP address to the gateway. The previous tunnel IP address may be used by the gateway as an identification of the client that allows the gateway to access information about the client's previous remote server connections. The previous tunnel IP address may also be used as a form of authentication. When the previous tunnel IP address has been shared only with the client or only with the remote servers and the client, then no other client or intermediary should be able to produce it.

FIG. 1 is a block diagram of a client in different environments in communication with remote servers through a gateway. The gateway 102 is coupled to one or more remote servers 104 to provide connections and services hosted by the remote servers 104. The gateway 102 is coupled to a client 110 through a network 106 such as a wide area network (WAN), a metropolitan area network (MAN), or a local area network (LAN) which may be the Internet or an intranet. The remote servers 104 may be coupled to the gateway 102 through similar types of networks. The remote servers 104 may be physical servers or virtualized resources in one or more distributed locations. The gateway 102 communicates packets between the client 110 and the remote servers 104. The client 110 may have one or more service applications to communicate with the remote servers 104, such as a web browser, email application, file transfer application, portal application, etc. The client 110 may also have a VPN application that is configured to configure and manage VPN sessions and to operate in different VPN protocols, such as those discussed herein, among others. The gateway 102 communicates with the client 110 using a VPN session 122 established by the VPN application of the client. The VPN session facilitates the use of a VPN protocol for secure tunneling through what may be an insecure network 106. The techniques and structures described here may be used in a variety of different specific physical connections and IP protocols. Those described here are provided only as examples.

The client 110 may be in a residential environment 112 with only an IPsec VPN tunnel available. The client 110 may be in an office environment 114 with only a TLS VPN tunnel available. The client 110 may be in a hotel environment 116 with only a DTLS VPN tunnel available. Some environments may offer a variety of different IP protocols in which case, the client selects one of the offerings. The type of environment and the available VPN tunnels are provided as examples and similar principles and techniques may be applied to many more environments and other connections. The gateway 102 has a second VPN session 124 with the client 110 at the office environment and a third VPN session 126 with the client 110 at the hotel environment 116.

The client 110 is shown in the three environments to indicate that the client may be operated in multiple different environments. It is contemplated that the client may be a notebook computer, tablet, or cellular telephone that connects in each environment through a wired or wireless network, for example Ethernet, Wi-Fi or a cellular network, however other movable electronic devices may be used instead. The client may be a virtual machine, a thin client, a point-of-sale device in any form, a mini-computer, a stick computer, or any other suitable movable device.

When the client 110 is moved from the residential environment 112, for example, then the first VPN session 122 is ended. When the client 110 is taken to the office environment 114 or the hotel environment 116, then a new session begins. When the first VPN session 122 is ended, the user will experience disruption of the workflow. By using the same tunnel IP address for each VPN session, a seamless VPN solution is offered that integrates different flavors of VPNs to provide secure connectivity to the client even when a VPN application running on the client is connecting to the VPN gateway over an unsecure network.

The client connects to one type of VPN protocol at a time, e.g. IPsec, TLS, or DTLS. If the user wants to switch between an IPsec VPN and a TLS VPN, the client disconnects and reconnects using the new protocol. Without this seamless connectivity, the disconnect and reconnect results in a change of the VPN tunnel address assigned to the client by the gateway and the remote server connections are ended. The client connection with the remote servers can be kept intact when the remote sessions on the client do not see any change. The client connection can be kept intact when the client switches from one VPN type to another, by reusing the same tunnel IP address. The gateway can migrate the remote sessions from the previous VPN tunnel to the new VPN tunnel.

Figure 2:
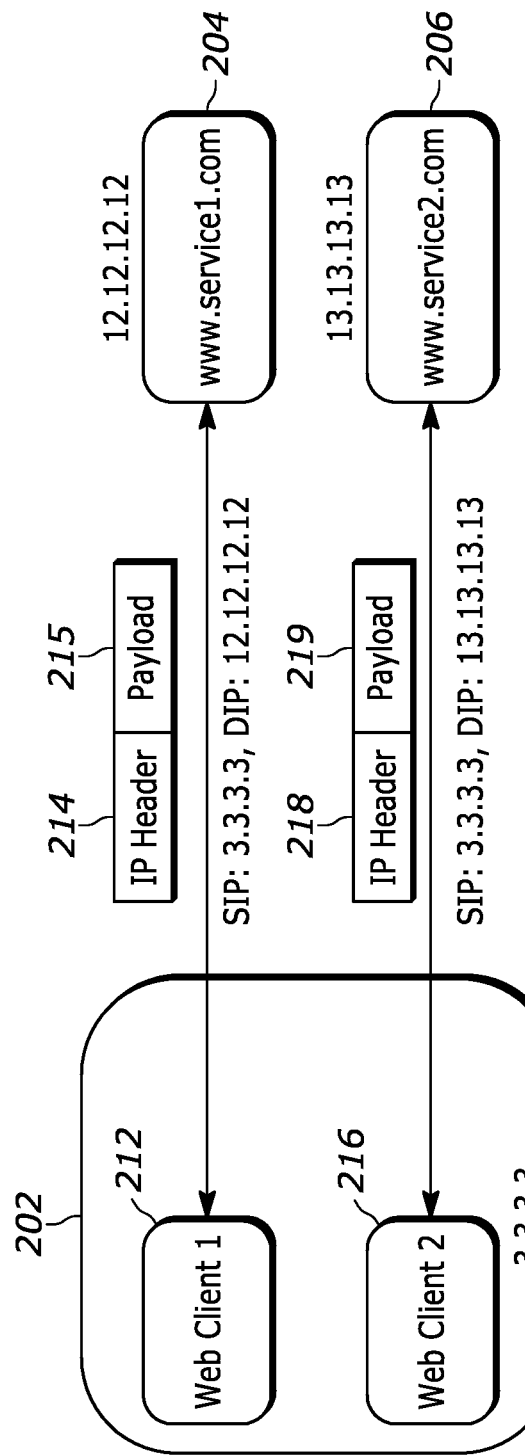
FIG. 2 is a diagram of a client communicating with remote servers.

FIG. 2 is a diagram of a client communicating with remote servers. The use of source IP addresses and destination IP addresses is shown for a simple example of a client communicating with two different remote servers using conventional Internet traffic with TCP/IP. The client may or may not be in a session with the remote servers. The client 202 has a client IP address shown as 3.3.3.3 for illustration purposes. A first remote server 204 has a uniform resource locator (URL) of www.service1.com and an IP address of 12.12.12.12. A second remote server has a URL of www.service2.com and an IP address of 13.13.13.13. The remote servers may provide any of a variety of different services, such as messaging, posting, communications, media consumption, informational services, or any other suitable web service. Additional elements of the communication path between the client and the remote servers, for example, routers, switches, hubs, and modems, are not shown in order to simplify the diagram.

The client 202 has a first web client 212 in communication with the first remote server 204 and a second web client 216 in communication with the second remote server 206. The web clients may be in any suitable form, for example tabs of a personal computer web browser, web-enabled, applications, widgets, application programming interfaces (APIs), or any other structure, device, or module. In some circumstances, a web service at a remote server uses the client IP address to communicate with and uniquely identify the client 202. In some circumstances, a session is established between a web service at the remote server and the client. The session may be linked to the client IP address.

The first web client 212 communicates with the first remote server 204 using packets that have an IP header 214 and a payload 215. The IP header 214 includes a source IP address (SIP) and a destination IP address (DIP). For packets from the client 202, the SIP is 3.3.3.3 and the DIP is 12.12.12.12 (as shown). For packets from the remote server 204 to the client 202, the addresses are reversed. The SIP is 12.12.12.12 and the DIP is 3.3.3.3. The client IP address is associated with all web traffic of the client and may be set by an Internet Service Provider (ISP), system administrator, or service. In some circumstances, if the client is restarted, a new client IP address will be assigned. In some circumstances, the client is always assigned the same client IP address when coupled to the same internet service.

In the same way, the second web client 216 communicates with the second remote server 206 using packets that have an IP header 218 and a payload 219. For packets from the client 202 the SIP is 3.3.3.3 and the DIP is 13.13.13.13 (as shown). For packets from the remote server 206 to the client 202, the addresses are reversed. The SIP is 13.13.13.13 and the DIP is 3.3.3.3.

Figure 3:
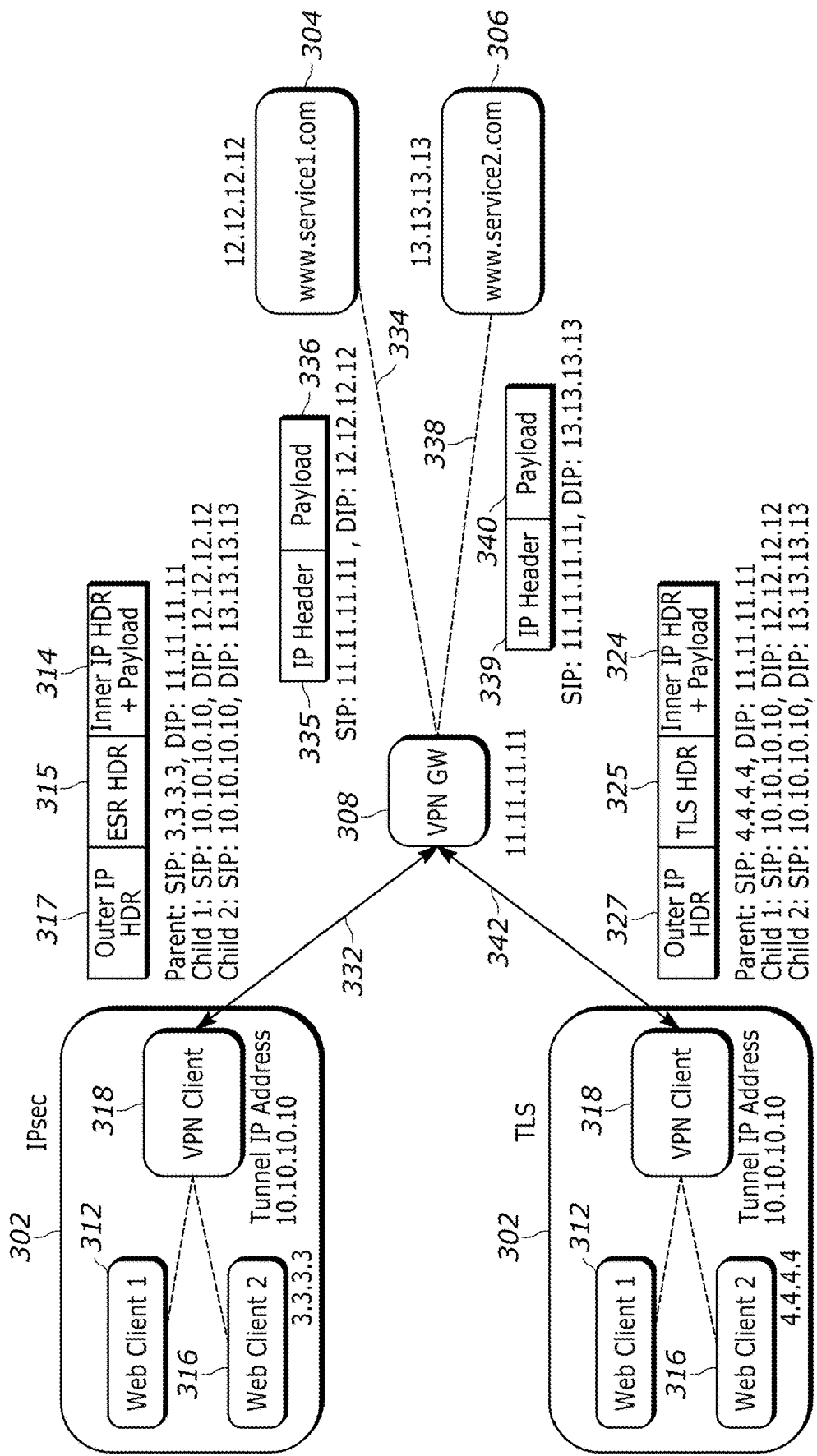
FIG. 3 is a diagram of a client communicating with remote servers through a gateway suitable for embodiments herein.

FIG. 3 is a diagram of a client communicating with remote servers through a gateway. The use of source IP addresses and destination IP addresses is shown for a simple example of a client communicating at two different environments with two different remote servers through a single gateway. The client may or may not be in a session with the remote servers. The client 302 has a client IP address of 3.3.3.3. A first remote server 304 has the same uniform resource locator (URL) of www.service1.com and IP address of 12.12.12.12. A second remote server has the same URL of www.service2.com and IP address of 13.13.13.13. The remote servers may be the same servers as in FIG. 2. The client 302 has a first web client 312 or other utility in communication with the first remote server 304 and a second web client 316 or other utility in communication with the second remote server 306. The web clients 312, 316 communicate through a VPN client 318 on the client 302. The VPN client 318 may be an application or a connected device. The VPN client 318 is in communication with a VPN gateway 308. The VPN gateway has a routable gateway IP address of 11.11.11.11 and has provided a tunnel IP address to the VPN client 318 of 10.10.10.10. Any communications from the VPN client 318 to the VPN gateway 308 uses the client IP address, 3.3.3.3 as the SIP and the routable gateway IP address of 11.11.11.11 as the DIP.

Packets between the client 302 and the VPN gateway 308 are encapsulated and tunneled through the VPN using TCP/IP and appropriate tunneling and security protocols. The first web client 312 sends packets to the first remote server 304 through the VPN client 318 using the tunnel IP address, 10.10.10.10 as its SIP. Similarly, the second web client 316 sends packets to the second remote server 306 using the same tunnel IP address 10.10.10.10 as its SIP. The packets sent from and to the web clients are encapsulated and de-capsulated by the VPN client.

In a typical VPN configuration, the VPN client 318 is an application on the client, although it may be incorporated into a web client, or a communications modem as hardware or software.

An encapsulated packet sent through the tunnel to the VPN gateway 308 from the VPN client 318 has an outer IP header 317, and the encapsulated payload 314 is an inner IP header and payload. There may also be additional headers for the particular VPN protocol. For an IPsec VPN protocol, an encapsulating security header (ESP) header 315 may be used. The inner IP header and payload are typically encrypted to protect them from observation or attack. The encapsulated payload 314 may also have other components, depending on the VPN protocol. The outer IP header or parent packet header is for a packet from the client 302 to the VPN gateway 308 with SIP of 3.3.3.3 and DIP of 11.11.11.11. The inner packet header uses the tunnel IP address 10.10.10.10 as the SIP and the DIP address depends on the eventual packet destination. The DIP is 12.12.12.12 for the first server 304 and 13.13.13.13 for the second server 306. These are indicated as the child 1 header and child 2 header, respectively. Due to the encapsulation, the tunnel IP address and the eventual destinations are not visible. The web clients communicate through the VPN client as if the tunnel IP address is the client IP address and may not have access to the client IP address. The VPN client establishes a VPN session with the VPN gateway 308 and performs external communications to establish the client IP address.

At the VPN gateway 308, the VPN gateway may de-capsulate the inner or child packet and send it to the respective destination using a gateway IP address as the SIP. More typically, the VPN gateway 308 will first change the SIP of the packet to a routable gateway IP address, in this example, 11.11.11.11 and then forward the packets. The routable gateway IP address may be the same or different from the address used by the VPN client 318. In some circumstances when Network Address Traversal (NAT) is not used between the VPN gateway 308 and the remoter servers 304, 306, the VPN gateway 308 may use the tunnel IP address 10.10.10.10 as the SIP to send packets to the remoter servers 304, 306. The remote servers 304,306 communicate with the VPN gateway using the routable gateway IP address and do not have the client IP address. Since the tunnel IP address is assigned by the VPN gateway, it may be configured in any suitable way.

A first remote packet forwarded from the VPN gateway 308 to the first server 304 is shown with an IP header 335 and payload 336. The SIP of the IP header 335 is changed from the tunnel IP address in the inner IP header of the encapsulated payload 314 sent by the first web client to the routable gateway IP address 11.11.11.11. This allows the VPN gateway to minimize the number of routable IP addresses that it uses to support its routing functions. The DIP is the same as the DIP received as the inner packet header from the client 302. Any reply from the first server 304 will accordingly use the first server IP address 12.12.12.12 as the SIP and the routable gateway IP address 11.11.11.11 as the DIP. The first remote packet may be secured using any suitable technique. A session 334 may be established between the client 302 and the first server 304 through the VPN gateway 308.

A second remote packet forwarded from the VPN gateway 308 to the second server 306 is shown with an IP header 339 and payload 340. The path may correspond to a second session 338 between the client 302 and the second server 306. As with the first remote packet, the SIP is changed from the tunnel IP address to the routable gateway IP address 11.11.11.11. The DIP is the same as the DIP received as the inner packet header from the client 302. Any reply from the second server 306 will accordingly use the second server IP address 13.13.13.13 as the SIP and the routable gateway IP address 11.11.11.11 as the DIP.

As mentioned above, the web clients 312, 316 communicate through the VPN client 318 using the tunnel IP address 10.10.10.10. All of the traffic to and from the web clients uses the tunnel IP address as the source IP address instead of the client IP address, 3.3.3.3. The web clients may not know the client IP address but only the tunnel IP address. Any sessions or connections operated by the web clients uses the tunnel IP address. In the IPsec environment a first session 332 is established between the client 302 and the VPN gateway 308. When the client 302 moves from the IPsec environment, the first session 332 is disconnected. When the client moves to, for example, a TLS environment, a second session 342 is established. The client 302 is assigned a different client IP address 4.4.4.4. When the VPN gateway re-assigns the same tunnel IP address, this allows the web clients to resume communications with the remote servers as if the original first VPN session 332 had not been interrupted.

Packets from the VPN client 318 to the VPN gateway 308 in the TLS environment have different addresses. In the outer IP header 327, the VPN client 318 uses the newly assigned client IP address and a suitable routable gateway IP address such as the previous address 11.11.11.11. In this example the SIP is 4.4.4.4 and the DIP is 11.11.11.11. For packets sent from the VPN gateway 308, the addresses are reversed. If the same tunnel IP address is used, then the inner IP header and payload 324 in the second session 342 will be the same as with the first VPN session 332. For a TLS VPN protocol, an TLS header 325 may also be used in the packet. At the VPN gateway 308, packets received from the second VPN session 342 are decapsulated and forwarded with the same IP headers 335, 339 as packets from the first session 332. Packets received from the servers 304, 306 during the second VPN session 342 have the same IP headers as with the first VPN session 332. However, the VPN gateway 308 uses a different outer IP header 327 in the second session 342 to route encapsulated packets to the second client IP address.

Figure 4:
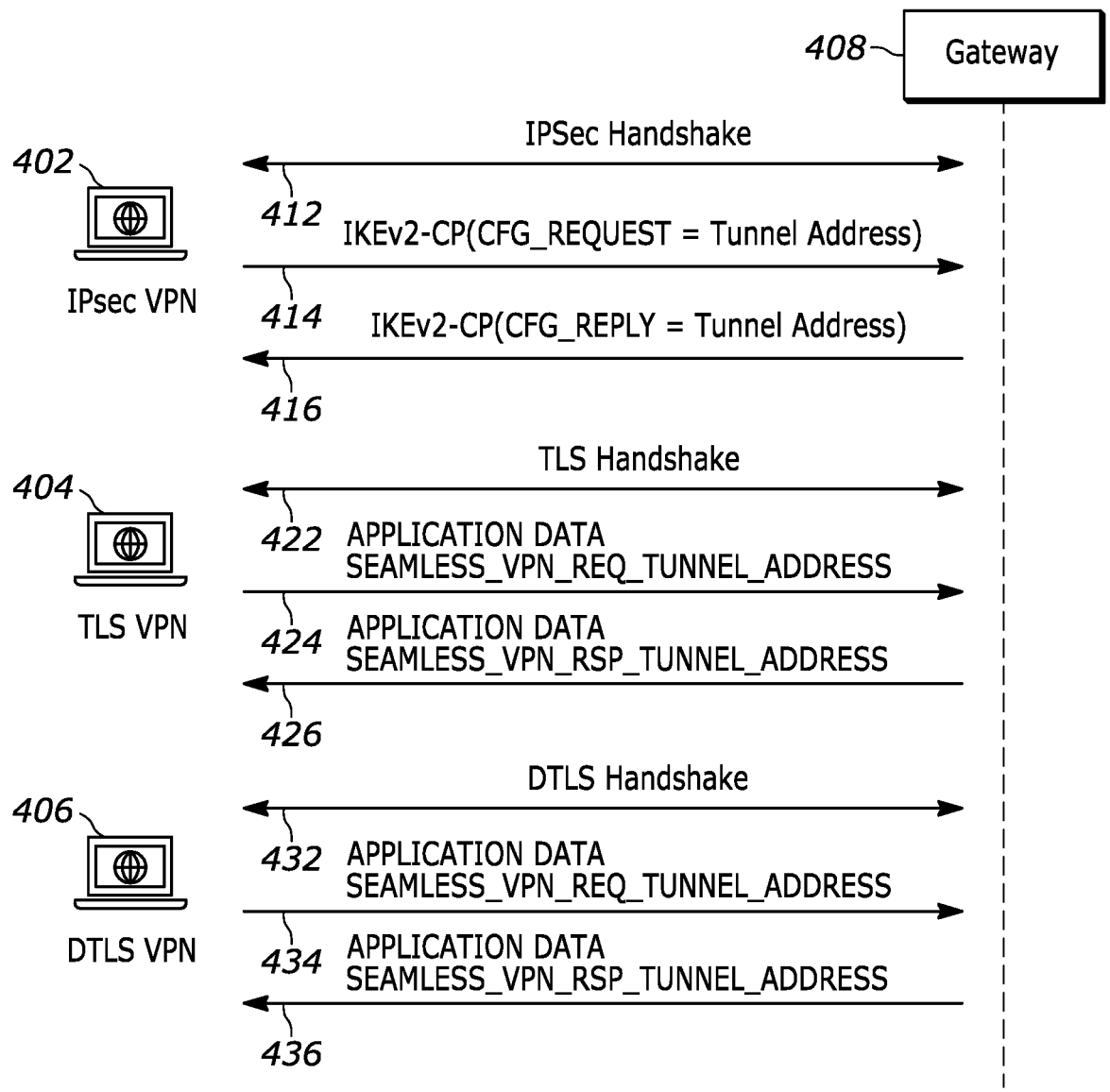
FIG. 4 is a signaling diagram of three clients with a gateway to establish a consistent tunnel IP address in three different environments suitable for embodiments herein.

FIG. 4 is a signaling diagram of three clients with a gateway to establish a consistent tunnel IP address in three different environments. The first client 402, the second client 404, and the third client 406 may be the same client or two or three different clients. A client may start as any one of the three clients in any one of the three different environments and then move to any of the other two remaining different environments. Each client is used to show differences between signaling in the respective environment of the client. While three different environments and three different VPN protocols are shown, there may be more or fewer. A first client 402 connects from, e.g., a home environment to a gateway 408 using a VPN tunnel with an IPsec protocol. The first client 402 after being authenticated to the gateway 408 and after the tunnel is established, completes an IPsec VPN handshake 412. The first client 402 sends a request 414 for an assigned persistent tunnel IP address. In some embodiments, the gateway 408 includes a session management module that assigns, stores, and maintains the tunnel IP address for each client. The gateway 408 sends a reply 416 that contains the tunnel IP address. The first client 402 stores the tunnel IP address for later use. In some embodiments, the client 402 includes a VPN client that establishes the VPN session, communicates through the VPN tunnel with the gateway and stores the tunnel IP address.

In this first example, with an IPsec protocol, the request 414 for a persistent tunnel IP address may take a form, for example, of IKEv2-CP(CFG_REQUEST=Tunnel Address), although other forms may be used to suit different implementations. The reply 416 may take the form of IKEv2-CP(CFG_REPLY=Tunnel Address), although other forms may be used as well.

If this tunnel is disconnected and then reconnected, then the client 402 may request an assignment of the same tunnel IP address using a suitable IPsec protocol request. The request may include the previous tunnel IP address which the client has stored for later use in making the tunnel IP address persistent.

A second client 404 connects from e.g. an enterprise environment to the gateway 408 using a VPN tunnel with a TLS protocol. After being authenticated to the gateway and establishing the tunnel, the second client completes a TLS handshake 422. The second client 404 sends a request 424 to the gateway 408 for a seamless transition. This request includes the previously assigned tunnel IP address from an earlier VPN session with the gateway 408. The gateway 408 sends a reply 426 to acknowledge the request which may also include the previously assigned tunnel IP address.

In embodiments, the request 424 in a TLS protocol may take a form, for example, of

APPLICATION DATA SEAMLESS_VPN_REQ_TUNNEL_ADDRESS, wherein "TUNNEL_ADDRESS" is the actual previous tunnel IP address. Similarly, the reply 426 may take a form, for example, of

APPLICATION DATA SEAMLESS_VPN_RSP_TUNNEL_ADDRESS.

The particular form may be adapted to suit particular implementations. The tunnel IP address may be sent separately from the request.

When a client moves from a home to an office environment or makes some other change in the VPN tunnel, the client may be forced to switch to a different VPN protocol and establish a new tunnel due to differences in security policies. When the client uses, for example, a VPN client, e.g. an application running on the client, to request a previously assigned tunnel IP address, then, for example, an SMM module of the gateway re-assigns the previously assigned tunnel IP address once it authenticates the client to the new tunnel. As a result, the client does not experience any disruption. The same will happen when a client moves, for example, from work to a hotel and the client is forced to switch to another VPN protocol, for example SSL-DTLS.

The client obtains the tunnel IP address from a gateway that conducted the previous VPN session. The client may obtain the tunnel IP address in a manner similar to that shown as reply 416. The same content may be sent as a reply in a TLS, DTLS or other IP protocol. Similarly, the client may go from a TLS VPN session to an IPsec VPN session. In such an example, the client receives the tunnel IP address from the gateway during the TLS VPN session by sending a request and, in some embodiments, a request that the tunnel IP address be persistent or sticky across VPN sessions. After the TLS VPN session is closed and a new IPsec VPN session is opened, then the client sends a request similar to the seamless VPN request 424 configured as appropriate for an IPsec VPN protocol.

A third client 406 connects from e.g. a travel environment to the gateway 408 using a VPN tunnel with a DTLS protocol. After being authenticated to the gateway and establishing the tunnel, the third client completes a DTLS handshake 432. The third client 406 sends a seamless transition request 434 to the gateway 408. This request includes the previously assigned tunnel IP address from a previous VPN session with the gateway 408. The gateway 408 sends a reply 436 to acknowledge the request which may also include the previously assigned tunnel IP address. The request 434 and reply 436 may take a form similar to that of the request 424 and reply 426 of the second client 404 using the TLS protocol tunnel.

FIG. 5 is a diagram of an example protocol header 500 suitable for carrying requests and replies as described above in a TLS or DTLS VPN protocol. The protocol header 500 has a first section with a version No. field 502, a message type field 504 and a reserved field 506. A second section has a session ID field 512. A third section has a sequence number field 514. A fourth section has a data length field 516, and a fifth section has a TLV (Type Length Value) field 518.

In order to support the signaling described above, the version No. field 502 may have a new version No. indicating a seamless VPN protocol. The seamless VPN protocol allows for a client to maintain a previous tunnel IP address as described above. The version No. may take a form, for example, of "Version(8)—0x1" to indicate version 1 of the seamless VPN protocol.

The message type field 504 may contain the messages provided above in the signaling of FIG. 4. Some of the message types may be:

SEAMLESS_VPN_REQ_TUNNEL_ADDRESS
SEAMLESS_VPN_RSP_TUNNEL_ADDRESS
SEAMLESS_VPN_HEART_BEAT

The heart beat message may be used to maintain a connection during pauses in the packet exchange between the client and the remote servers. The heart beat message allows the VPN session and the authentication to be maintained.

The session ID field 512 refers to the VPN session with the gateway and will correspond to a new VPN session each time the VPN tunnel is reestablished. The sessions are thus restarted. The data length field 516 indicates the total length of the header in bytes including TLVs as described in more detail below.

FIG. 6 is a diagram of an example TLV field 518 suitable for use with the header of FIG. 5 in a TLS or DTLS VPN protocol. The header has a first section with a type field 602, a reserved field 604 and a length field 606 to indicate the total length of the TLV field in bytes. A second section contains a data field 612. As examples, the type field 602 may contain messages as follows:

SEAMLESS_TLV_VPN_IPV4
SEAMLESS_TLV_VPN_IPV6
SEAMLESS_TLV_HEART_BEAT_REQ
SEAMLESS_TLV_HEART_BEAT_RSP

These messages indicate the IP version to be used and a heart beat exchange (request and response) to keep the connection alive.

The data field 612 may be used to allow the client to request specific configurations for handling the tunnel IP address in the new VPN session. Each TLV has a code in the form of a hexadecimal numeric value, for example, 0xFFFFFFFF. The code is a message to the gateway to set a particular configuration. As examples, the data field may contain codes as follows, among others:

0x00000000—Initial Start. Request for Non-Sticky Tunnel IP Address.
0xFFFFFFFF—Initial Start. Request for Sticky Tunnel IP Address.
Specific Value—Request for Specific Tunnel IP Address (IPv4/IPv6)

Similar messages may be used by the gateway as follows:

0x00000000—Non-Sticky Tunnel IP Address—Initialized
0xFFFFFFFF—Sticky Tunnel IP Address—Initialized
Specific Value—Specific Tunnel IP Address—Assigned The first code indicates to the gateway that the client requests that the new session be initialized using a "non-sticky" tunnel IP address. Sticky is used herein to refer to a tunnel IP address that persists across VPN sessions, also referred to herein as a seamless VPN. The non-sticky tunnel IP address will be used for the current VPN session and then released. When the client begins a new session with the gateway, the gateway will assign a new tunnel IP address and any sessions with remote services will be lost. This mode may provide better security in some circumstances.

The gateway may provide a TLV data field with a code to indicate an acknowledgement. The tunnel IP address will be dropped after the session.

The second code indicates to the gateway that the client requests that the new session be initialized with a sticky tunnel address. The gateway may provide a TLV data field with a code to indicate an acknowledgement. The tunnel IP address will be stored in a table at the gateway and in another transaction, the tunnel IP address will be sent to the client.

The third code is a representation of the tunnel IP address that was earlier assigned to the client. When the client sends the tunnel IP address, then the gateway is able to assign the received tunnel IP address to the VPN session and resume any remote sessions and connections between the client and any remote servers. The gateway may send its third code indicating the tunnel IP address that was assigned to the client. The client may store the tunnel IP address later for the next time that it requests a sticky tunnel IP address. As discussed, after the gateway receives the tunnel IP address it may apply the received tunnel IP address to any tables of earlier remote sessions and connections and then then resume those remote sessions and connections. This allows the client to resume activity from the previous session in a seamless way.

The structure and information of the wrapper or outer packet for the VPN tunnel in the VPN session and the structure and information of the inner packets corresponding to remote sessions may be decoupled. The detail of the 5-tuples for the outer addresses and the inner addresses may be maintained in a memory at the gateway. This decoupling provides flexibility to update the VPN tunnel session details without a corresponding impact on the remote sessions that flow through the VPN tunnel. The remote sessions may be mapped to the corresponding VPN tunnel session. This map may be maintained in a database in a memory of the gateway.

In a typical VPN protocol, the client communicates through the VPN tunnel using the outer wrapper 5-tuple. The outer packet will use the client IP address as the source address in the header to send packets to the gateway. The inner packet uses the tunnel IP address as the source address in the header to send packets to remote servers. When the inner packet is de-encapsulated, the gateway forwards the inner packet to the remote server corresponding to the destination address of the inner packet. When NAT is used, the gateway removes the client tunnel IP address and replaces it with a routable gateway IP address before forwarding the inner packet to the corresponding remote server using the destination IP address of the packet received from the client. The remote server responds to the routable gateway IP address and does not see the client IP address. The gateway receives packets from the remote server and replaces the routable gateway IP address with the client tunnel IP address before encapsulating the inner packet for tunneling back to the client. The client does not see the routable gateway IP address except when the gateway using the same address for the VPN session with the client. By providing, the tunnel IP address to the client in a reply, the client is able to request that the tunnel IP address be made consistent across VPN sessions.

While the gateway may maintain a database to map remote session information to a tunnel IP address, this may not allow the gateway to map the remote session information to a particular client. When the client disconnects from one VPN session and then reconnects with a new VPN session, the client may have a different client IP address. The client IP address is determined by the ISP, a network administrator, or another entity that is not necessarily connected to the gateway. The gateway may not know that the two client IP addresses correspond to the same client. For both VPN sessions, the client may be required to authenticate before performing any sort of handshake and establishing the VPN tunnel. In order to authenticate a client, some sort of secure identification will be exchanged with the authentication authority. The authentication may also identify the client with some type of device identifier. However, when an external authentication service is used, the gateway does not know the identity of the device. In some embodiments, the details of the user and device are not provided to the gateway in order to improve security. For these reasons, the gateway may not be able to determine whether the client is the same in two different VPN sessions. When an authenticated client provides a previous tunnel IP address, then the gateway is able to apply the earlier tunnel IP address to the database of remote sessions.

The VPN tunnel information may be stored in registers at the gateway. As described, VPN session and remote session information is maintained in an indexed table, such as in a relational database, however any other storage or record format may be used. FIG. 7 is an example VPN session table 700. The session table 700 may be used for storing indices in an index column 710, for storing VPN session identifiers and other information in a VPN session column 712, for storing the tunnel IP address in a tunnel IP address column 714, and for storing remote session identifiers in a remote session columns 716. Multiple remote session columns 716 allow multiple remote sessions to be linked to each VPN session. Each row in the example of VPN session table 700 has an index in the index column 710, a corresponding VPN session identifier in the VPN session column, a tunnel IP address in the tunnel IP address column 716, and remote session identifiers in the remote session index columns 718. These indices link to a table about each remote session. A VPN session entry maintains the list of remote sessions that are flowing through it. The session identifier may be used in the VPN session table 700 to verify the tunnel IP address. The table also allows for comparing the tunnel IP address received from the client through the second tunnel to a stored tunnel IP address that is associated with the first secure tunnel.

FIG. 8 is an example remote session table 800 for tracking each of the remote sessions that go through a VPN session. This table is simplified to show only an index column 810, a remote session info column 812, and a VPN session index column 814. The remote session table 800 is for storing remote session information including remote session identifiers and IP addresses and for storing a VPN session index or identifier in association with the remote session information. The remote session table 800 allows the gateway to apply a remote session index from the remote session index columns 718 of the VPN session table 700 to the index column 810 of the remote session table 800 to find remote session information in the remote session info column 812. Alternatively, the VPN session may be linked to the appropriate remote sessions using the VPN session index column 814.

In use, when a client connects to a gateway using a VPN client at the client, a VPN Tunnel session is established. The gateway may then create an entry in the VPN Session Table 700 without any remote session indices. The primary key for this VPN session in the context of one particular tenant may be a 5-tuple <Client IP, VPN GW IP, Source Port, Destination Port, IP Protocol>. In some embodiments, a 4-tuple, 6-tuple, or other information set may be used. The 6-tuple may contain, <Client IP, VPN GW IP, Source Port, Destination Port, IP Protocol, Routing Instance>). A secondary key may also be assigned to the VPN session by the gateway that includes the tunnel IP address as follow: <Tunnel IP address, Routing Instance>.

With data traffic flowing from the client to remote servers, remote connections and remote sessions will be established. The gateway de-encapsulates traffic from the client and uses the assigned tunnel IP address between the gateway and the client. For each remote server remote connection, and remote session, a 5-tuple may be attached to the remote session table 800 to identify and describe the remote connection or remote session. This 5-tuple may take the form of <Destination IP address, Source Port, Destination Port, Protocol and Routing Instance>. From the VPN client's perspective, the Source IP address will be equal to the assigned tunnel IP address. The gateway may use the tunnel IP address as a source IP address with a remote server or a routable gateway IP address, depending on the network environment. A unique VPN remote session entry may be created in the remote session table 800 with an index referring to the corresponding VPN tunnel session. Subsequently, the remote session index is added to the remote session index column 718 of the VPN session table 700.

The same or similar tables may also be maintained by the client in a VPN application or in another place. Similar to the VPN session table 700, the client stores the details of each VPN session and any remote connections or sessions that were made during the VPN session. The web client uses the tunnel IP address in inner packet headers to communicate with the remote servers but the VPN client uses a client IP address in outer packet headers to communicate with the gateway. If the VPN client receives a tunnel IP address from the gateway, then the VPN client may store the tunnel IP address in association with an identifier for the corresponding VPN session. The VPN client may also share the tunnel IP address with the web clients for their use in resuming previous sessions and making new connections. Similar to the remote session table 800, the client stores information about each remote connection and remote session. All of the information in the remote session table 800 may be stored also by the client or a VPN client application at the client, except that the source information will be client information and not the information used by the gateway.

As described, the client may be required to end a VPN session in one place or on one network and establish a new VPN session at another place or on another network. IPsec has an Internet Key Exchange (IKE) v2 Dead Peer Detection (DPD) process that allows the client to ping the gateway and determine that the client is no longer in communication through the session. TLS and DTLS use Heartbeat TLV messages so that when the Heartbeat TLV is no longer received from the peer, the client determines that the gateway is no longer in communication through the session. When the client migrates to a different VPN session, a new VPN session may be established and features of the previous session may be transferred to the new VPN session because the previous VPN session has been ended In the new VPN session, the client has a new client IP address or Source IP Address. Using the previous tunnel IP address, the gateway is able to find the previous session and the remote sessions that were associated with the previous session. The gateway may then use the remote session information to resume those remote sessions. The remote servers do not see the change in client IP address or any of the other changes between the client and the gateway. By mapping the new VPN session to the previous tunnel IP address, the gateway is able to use the same tunnel IP address as a source address with the remote servers. The new packets are handled by the remote servers as if they are coming from the same source IP address.

Figure 9:
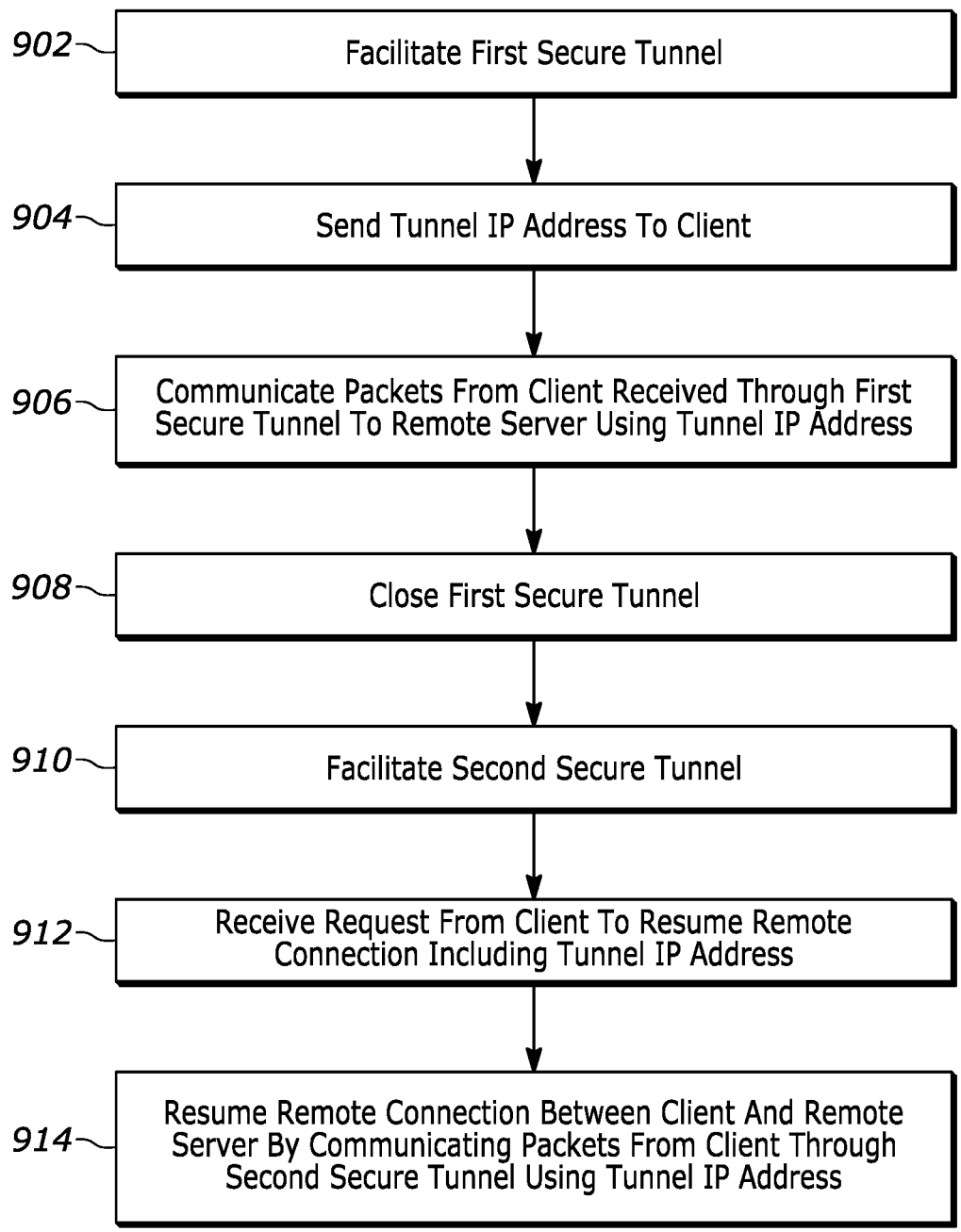
FIG. 9 is a process flow diagram of a process for maintaining communication between a remote server and a client at a gateway through different secure tunnels suitable for embodiments herein.

FIG. 9 is a process flow diagram of a process for maintaining communication between a remote server and a client at a gateway through different secure tunnels. Initially, the client establishes a secure tunnel with the gateway. This may include authentication with the gateway or an external service, various handshakes, and other operations, depending on the nature of the IP protocol and the environment of the client and the gateway. With the secure tunnel established at 902, the gateway facilitates a first secure tunnel with the client. Facilitating the first secure tunnel allows for encrypted, encapsulated communication between the client and the gateway. In some embodiments, the client establishes a VPN session with the gateway. The gateway may then store a session identifier in association with the client IP address, the tunnel IP address, and other parameters. In some embodiments, the session may have parameters including tunnel IP address persistence and an expiration. Validating the parameter would be validating that the session has not expired At 904, the gateway sends the tunnel IP address to the client. This may be in response to a request from the client, for example a request for a persistent tunnel IP address. For TLS or DTLS IP protocol, the request may be sent in a Type Length Value (TLV) field of a virtual private network (VPN) protocol header through the first tunnel. In some embodiments, the tunnel IP address is sent in a first secure channel of the VPN protocol. The gateway may also store the tunnel IP address in one or more tables for later reference.

At 906, the gateway communicates packets from the client received through the first secure tunnel to the remote server using the tunnel IP address in the first secure tunnel with the client gateway. In some embodiments, the gateway uses the tunnel IP address in a remote connection with a remote server. In embodiments, the gateway is de-capsulating packets from the client, for example by removing the outer wrapper that includes the client's IP address. The gateway then forwards the de-capsulated packets to the remote server using a routable gateway IP address or the tunnel IP address as a source address and an IP address of the remote server as a destination IP address. The gateway may be encapsulating the packets with a different outer wrapper to be sent from the gateway to the remote server. Similarly, packets from the remote server are modified by removing the routable gateway IP address as the destination IP address and replacing it with the tunnel IP address. The gateway is then modifying packets by encapsulating packets for the secure tunnel. The packets are encapsulated in an outer wrapper and securely sent to the client through the tunnel.

At 908, the first secure tunnel with the client is closed. The gateway may close the first secure tunnel when there are no heartbeat messages exchanged or when a specific message is sent from one node to the other that closes the secure tunnel.

At 910 a second secure tunnel is facilitated with the client. The client may establish this from the same or a different environment using the same or a different network provider, for example an ISP or enterprise system. In the second secure tunnel, the client has a different client IP address from the first secure tunnel. At 912, the gateway receives a request from the client to resume the remote connection that had been maintained with a remote server. The request includes the tunnel IP address from the first secure tunnel. The gateway that is facilitating the second secure tunnel may use the tunnel IP address to send packets to the client and thereby maintain continuity with the remote server. In other instances, the gateway may take an active step to resume the connection.

At 914, the gateway resumes the remote connection by communicating packets from the client received through the second secure tunnel using the tunnel IP address in the connection between the client and the gateway. When a remote connection is a previous session between the client and the remote server, then the session is also resumed.

Figure 10:
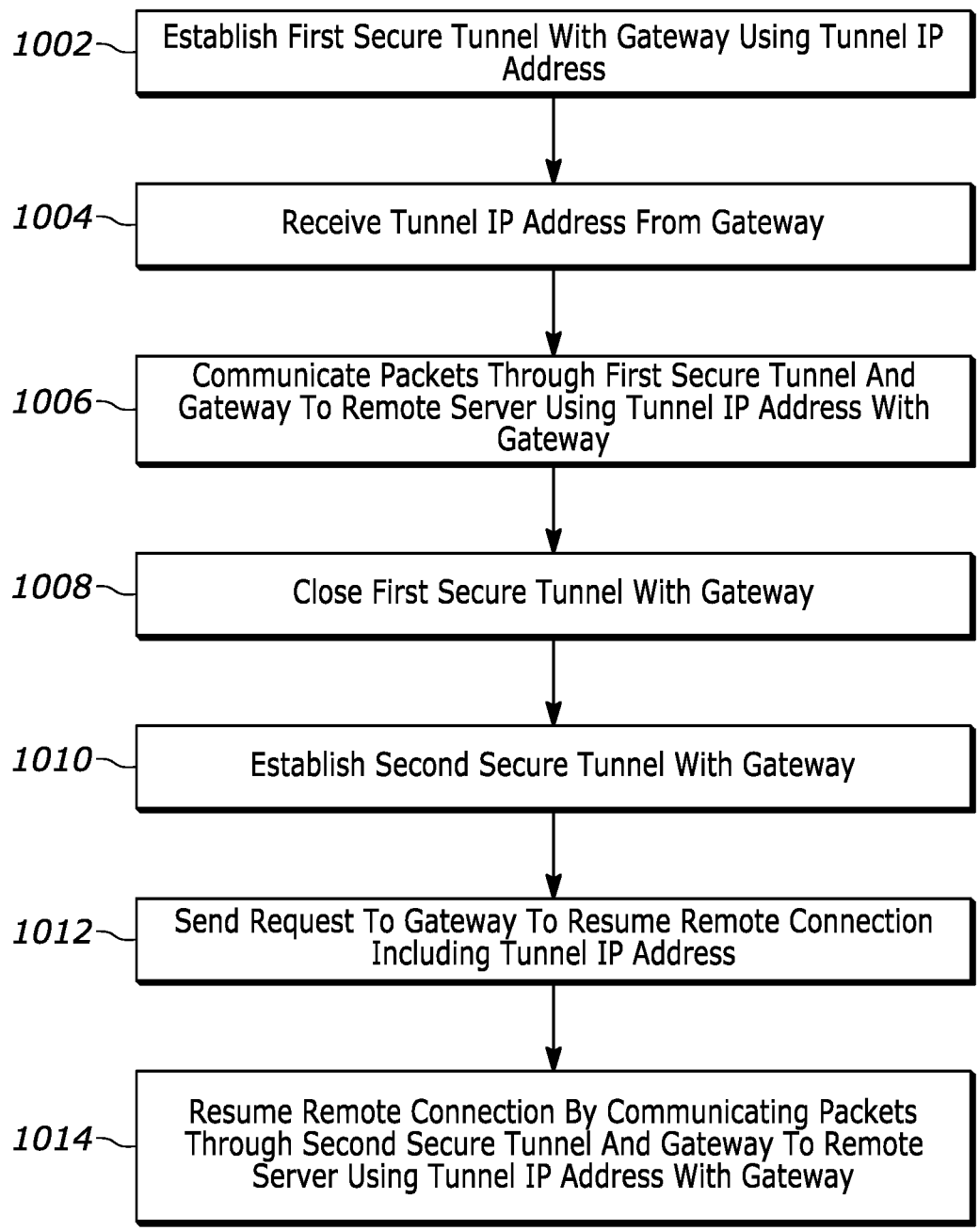
FIG. 10 is a process flow diagram of a process for a client to maintain communication with a remote server through different secure tunnels and a gateway suitable for embodiments herein.

FIG. 10 is a process flow diagram of a process for a client to maintain communication with a remote server through different secure tunnels and a gateway. The client may first access a network connection and authenticate to the gateway. At 1002 the client establishes a first secure tunnel to the gateway. The first secure tunnel uses a tunnel Internet Protocol (IP) address. At 1004, the client receives the tunnel IP address from the gateway. In some embodiments, the client first requests the tunnel IP address. In some embodiments, the client requests a persistent tunnel IP address across VPN sessions and receives the tunnel IP address in response to the request.

At 1006, the client communicates packets through the first secure tunnel and the gateway to the remote server. The client encrypts and encapsulates packets sent to the gateway through the tunnel and de-encapsulates packets received from the gateway through the tunnel. The gateway uses the tunnel IP address in the first secure tunnel between the gateway and the client. In embodiments, the gateway de-capsulates packets from the client and forwards the de-capsulated packets to the remote server using a routable gateway IP address or the tunnel IP address as a source address and an IP address of the remote server as a destination IP address.

At 1008, closing the first tunnel, the first secure tunnel is closed with the gateway. At 1010, the client establishes a second secure tunnel with the gateway and at 1012 sends a request to the gateway to resume the remote connection. The request includes the tunnel IP address that was received from the gateway through the first secure tunnel At 1014, the client resumes the remote connection by communicating packets through the second secure tunnel and the gateway to the remote server using the tunnel IP address in the remote connection between the gateway and the remote server.

Figure 11:
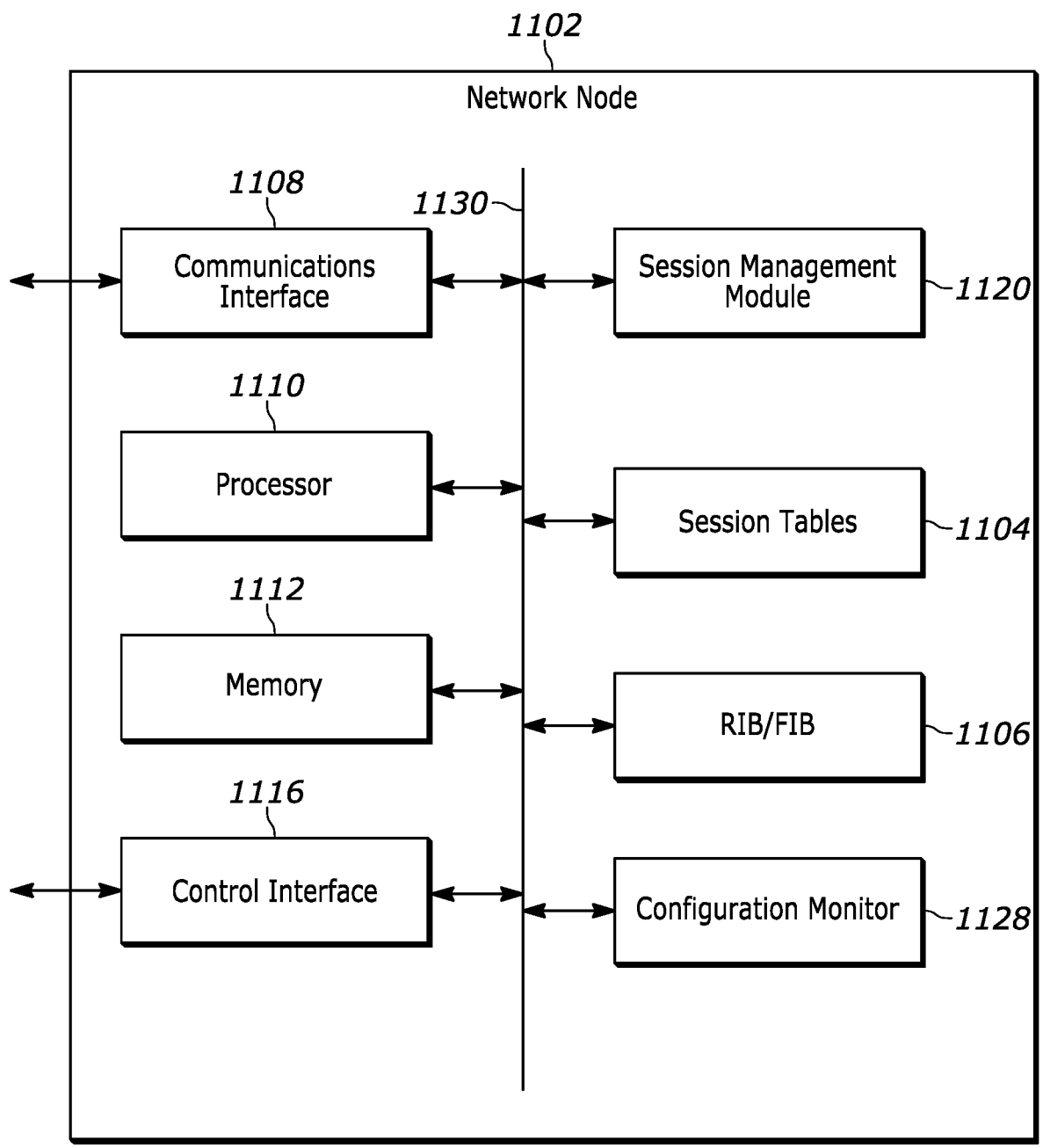
FIG. 11 is a block diagram of an apparatus, such as a node, that communicates as a client, gateway, or remote server suitable for embodiments herein.

FIG. 11 is a block diagram of an apparatus, such as a node 1102, that communicates as a client, gateway or remote server as described herein. The node may be a gateway, a source branch, a destination branch, an edge node, or a hub node, or another network node according to embodiments herein. The node includes a communications interface 1108, a processor 1110, and a memory 1112 connected together through a bus 1130. The processor 1110 may include a multifunction processor and/or an application-specific processor. The memory 1112 within the node may include, volatile and non-volatile memory for example, a non-transitory storage medium such as read only memory (ROM), flash memory, Random Access Memory (RAM), and a large capacity permanent storage device such as a hard disk drive.

The communications interface 1108 enables data communications with authentication, secure tunnels, SLA metrics, route exchange, capability exchange, session establishment, etc., as described herein via local and wide area connections using one or more different protocols including IPsec, TLS, DTLS, Multiprotocol Border gateway Protocol (MP-BGP), VXLAN, Multi-Protocol Label Switching (MPLS), etc. The node 1102 executes computer readable instructions stored in the storage medium of the memory 1112 to implement various tasks as described herein. The node 1102 further includes a routing table manager with a routing information base/forwarding information base (RIB/FIB) 1106 and various other traffic caches (e.g., application cache, domain application cache, client route cache, and application route cache) to store mapping information and other traffic communication data coupled to the bus 1130. The computer in the form of the network node 1102 executes computer readable instructions stored in the storage medium to implement various tasks as described above.

A control interface 1116 may be provided for node management and configuration purposes as an interface to a computer monitor or flat panel display but may include any output device. In addition, the control interface 1116 may include an interface to a computer keyboard and/or pointing device such as a computer mouse, computer track pad, touch screen, etc., that allows a user to provide inputs and receive outputs including a GUI (graphical user interface). A GUI can be responsive to user inputs and typically displays images and data. The control interface 1116 can be provided as a web page served via a communication to a remote device for display to a user and for receiving inputs from the user. Additionally, each of the modules may be implemented through instructions stored on a non-transitory computer-readable storage medium. The computer-readable instructions, e.g., program instructions, are executed on a physical processor of a computing system that supports the node to cause the computer to perform the operations described herein, among others.

The node 1102 includes a configuration monitor 1128 to monitor policy input including VPN protocols, network interface state updates, and remote monitor updates, among others. The configuration monitor 1128 generates alerts or interrupts and updates backup status when there are changes to any of the monitored network node state and configurations. The configuration monitor 1128 may also maintain the RIB/FIB 1106.

The node further includes session tables 1104 as shown, e.g. in FIGS. 7 and 8 and a session management module (SMM) 1120 to monitor any sessions that are established by the node or with the node through a VPN or other connection. In embodiments, the session management module includes a VPN client. Another session management module may be coupled to web clients that are operated by the processor 1110.

The embodiments disclosed herein can be implemented through at least one software program running on at least one hardware device and performing network communication functions to connect through secure tunnels and with remote servers.

It is understood that the scope of the protection for systems and methods disclosed herein is extended to such a program and in addition to a computer readable storage medium having a message therein, to such a computer readable storage medium containing program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method of maintaining communication between a remote server and a client through different secure tunnels, the method comprising:
   at a virtual private network (VPN) gateway, facilitating a first VPN session between the client and the VPN gateway, the first VPN session having a tunnel Internet Protocol (IP) address that was assigned by the VPN gateway, the first VPN session using a first VPN protocol;
   at the VPN gateway, sending the tunnel IP address to the client;
   at the VPN gateway, changing the tunnel IP address to a routable gateway IP address and communicating packets from the client to the remote server using the routable gateway IP address as a source IP address to the remote server, wherein the packets are communicated from the client to the remote server through a remote connection of the VPN gateway with the remote server, and wherein the packets are received at the VPN gateway from the client through the first VPN session;
   at the VPN gateway, closing the first VPN session between the client and the VPN gateway;
   at the VPN gateway, facilitating a second VPN session between the client and the VPN gateway, the second VPN session using a second VPN protocol, which is different from the first VPN protocol;
   at the VPN gateway, receiving a request from the client to resume the remote connection with the remote server, the request including the tunnel IP address that was previously assigned to the client by the VPN gateway; and
   at the VPN gateway, resuming the remote connection by communicating packets from the client to the remote server using the routable gateway IP address as the source IP address to the remote server, wherein the packets are received at the VPN gateway from the client through the second VPN session.

2. The method of claim 1, further comprising assigning the received tunnel IP address to the second VPN session with the client in response to receiving the request.

3. The method of claim 1, further comprising:
   receiving a request for a persistent tunnel IP address from the client through the first VPN session, and
   wherein sending the tunnel IP address to the client is in response to receiving the request for a persistent tunnel IP address.

4. The method of claim 1, wherein sending the tunnel IP address to the client comprises sending the tunnel IP address in a Type Length Value (TLV) field of a virtual private network (VPN) protocol header through the first secure tunnel.

5. The method of claim 1, wherein the remote connection is a remote session between the client and the remote server, and wherein communicating packets comprises communicating packets in the first VPN session and in the second VPN session within the same remote session.

6. The method of claim 1, further comprising:
   receiving a request for a persistent tunnel IP address with the client through the first VPN session;
   facilitating the persistent tunnel IP address in response to the request for the persistent tunnel IP address; and
   storing the tunnel IP address in association with a session identifier of a VPN session.

7. The method of claim 6, further comprising:
   storing a parameter in association with the session identifier,
   wherein receiving the request comprises receiving the session identifier from the client, and
   validating the parameter before assigning the tunnel IP address through the second VPN session.

8. The method of claim 7, wherein the parameter includes an expiration and wherein validating the parameter comprises validating that the first VPN session has not expired.

9. The method of claim 1, wherein facilitating a first VPN session comprises connecting to a first secure session with the client wherein facilitating a second VPN session comprises connecting to a second secure session with the client, and wherein receiving a request from the client comprises receiving a session identifier for the first secure session.

10. The method of claim 9, further comprising applying the session identifier to verify the tunnel IP address.

11. The method of claim 1, further comprising comparing the tunnel IP address received from the client through the second VPN session to a stored tunnel IP address that is associated with the first VPN session.

12. The method of claim 1, wherein communicating packets through the first VPN session comprises de-capsulating packets received from the client with the tunnel IP address and forwarding the de-capsulated packets to the remote server using the routable gateway IP address as a source IP address to the remote server and an IP address of the remote server as a destination IP address.

13. The method of claim 12, further comprising storing the destination IP address in association with the tunnel IP address.

14. A non-transitory computer-readable storage medium containing program instructions, which when executed by the computer cause the computer to perform operations comprising:
   at a virtual private network (VPN) gateway, facilitating a first VPN session between the client and the VPN gateway, the first VPN session having a tunnel Internet Protocol (IP) address that was assigned by the VPN gateway, the first VPN session using a first VPN protocol;

at the VPN gateway, sending the tunnel IP address to the client;

at the VPN gateway, changing the tunnel IP address to a routable gateway IP address and communicating packets from the client to the remote server using the routable gateway IP address as a source IP address to the remote server, wherein the packets are communicated from the client to the remote server through a remote connection of the VPN gateway with the remote server, and wherein the packets are received at the VPN gateway from the client through the first VPN session;

at the VPN gateway, closing the first VPN session between the client and the VPN gateway;

at the VPN gateway, facilitating a second VPN session between the client and the VPN gateway, the second VPN session using a second VPN protocol, which is different from the first VPN protocol;

at the VPN gateway, receiving a request from the client to resume the remote connection with the remote server, the request including the tunnel IP address that was previously assigned to the client by the VPN gateway; and at the VPN gateway, resuming the remote connection by communicating packets from the client to the remote server using the routable IP address as the source IP address to the remote server, wherein the packets are received at the VPN gateway from the client through the second VPN session.

15. The medium of claim 14, the operations further comprising:

storing the tunnel IP address in association with a remote session identifier for a remote session between the client and the remote server that includes the routable gateway IP address, wherein resuming the remote connection comprises resuming the remote session using the remote session identifier.

16. The medium of claim 14, the operations further comprising receiving a request for a persistent tunnel IP address through the first VPN session;

facilitating the persistent tunnel IP address with the client in response to the request for the persistent tunnel IP address;

storing the tunnel IP address in association with a session identifier of the persistent tunnel IP address;

storing an expiration parameter in association with the session identifier; and validating the expiration parameter by validating that the first VPN session has not expired before assigning the tunnel IP address through the second secure tunnel.

17. A method of maintaining communication with a remote server through different secure tunnels and a virtual private network (VPN) gateway, the method comprising:

at a client, establishing a first VPN session with the VPN gateway, the first VPN session having a tunnel Internet Protocol (IP) address that was assigned by the VPN gateway, the first VPN session using a first VPN protocol;

at the client, receiving the tunnel IP address from the VPN gateway;

at the client, communicating packets through a remote connection with the remote server, the packets communicated from the client to the VPN gateway through the first VPN session having the tunnel IP address changed to a routable gateway IP address and using the routable gateway IP address as a source IP address to the remote server;

at the client, closing the first VPN session with the VPN gateway;

at the client, establishing a second VPN session with the VPN gateway, the second VPN session using a second VPN protocol, which is different from the first VPN protocol;

at the client, sending a request to the VPN gateway to resume the remote connection, the request including the tunnel IP address that was previously assigned to the client by the VPN gateway; and at the client, resuming the remote connection by communicating packets from the client to the remote server, wherein the packets are communicated from the client to the VPN gateway through the second VPN session using the tunnel IP address and the routable gateway IP address is used as the source IP address to the remote server.

18. The method of claim 17, further comprising:

sending a request for a persistent tunnel IP address from the client through the first VPN session in a Type Length Value (TLV) field of a virtual private network (VPN) protocol header.

19. The method of claim 17, wherein establishing a first VPN session comprises establishing the first a VPN session with the VPN gateway by a VPN client, the method further comprising establishing a remote session with the remote server by a web client, and wherein communicating packets to the remote server comprises sending packets from the web client in the remote session to the remote server through the VPN client in the first VPN session.

20. The method of claim 1, wherein receiving a request to resume the connection comprises receiving the request in a Type Length Value (TLV) field of a virtual private network (VPN) protocol header through the second secure tunnel.

\* \* \* \* \*